No. 715,920. Patented Dec. 16, 1902.
D. H. WILSON.
ELECTRIC BATTERY.
(Application filed Apr. 30, 1902.)
(No Model.)
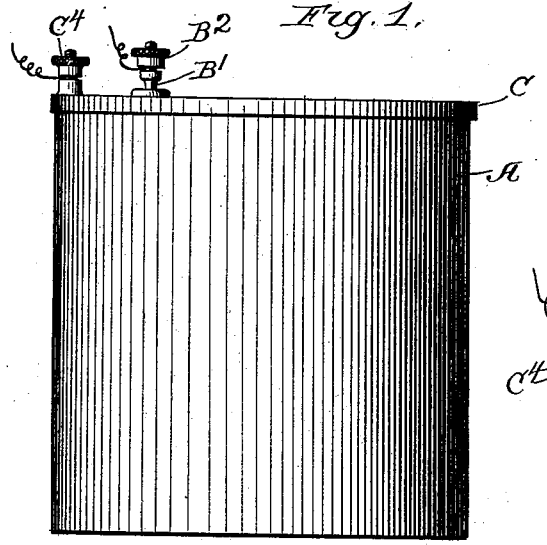
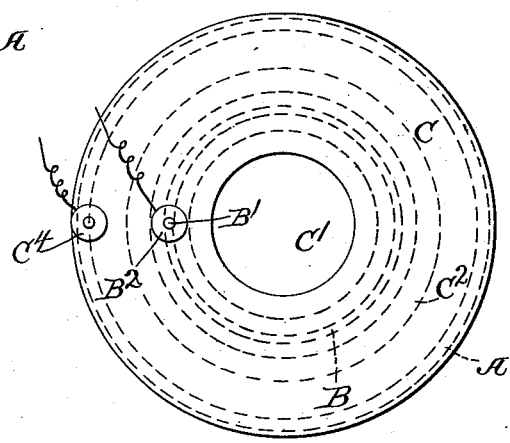
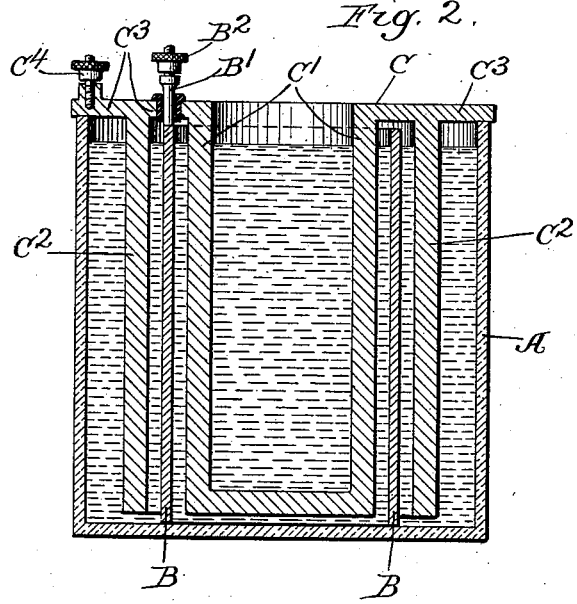
Witnesses,
Edward T. Wray
Homer L. Kraft
Inventor,
David H. Wilson
by Parker & Carter
Attorneys.

UNITED STATES PATENT OFFICE.

DAVID H. WILSON, OF CHICAGO, ILLINOIS.

ELECTRIC BATTERY.

SPECIFICATION forming part of Letters Patent No. 715,920, dated December 16, 1902.

Application filed April 30, 1902. Serial No. 105,281. (No model.)

*To all whom it may concern:*

Be it known that I, DAVID H. WILSON, a citizen of the United States, residing at Chicago, in the county of Cook and State of Illinois, have invented a certain new and useful Improvement in Batteries, of which the following is a specification.

My invention relates to electric batteries, and has for its object to provide a new and improved battery of this description.

My invention is illustrated in the accompanying drawings, wherein—

Figure 1 is a view of a battery embodying my invention. Fig. 2 is a section therethrough. Fig. 3 is a plan view.

Like letters refer to like parts throughout the several figures.

In making up my battery I provide an ordinary outer cup or jar A of any desired material. Within this jar is placed the electrode B, preferably of zinc or some analogous metal. This electrode is preferably cylindrical in shape. The other electrode C is preferably of carbon. This electrode is arranged so as to surround the electrode B, as it were, and have opposing faces opposite both the exposed faces of said electrode. As illustrated in the drawings, the electrode C may be said to consist of two cups $C'$ and $C^2$, integral with each other and separated by a space, the electrode B being received in this space. For purposes of illustration I have shown these cups or receptacles as circular; but it is of course evident that they may be of any other shape. Said electrode B has a projecting part $B'$, which extends through the connecting portion $C^3$ between the two cups $C'$ and $C^2$, said portion provided with a terminal $B^2$ for the conductor leading from the battery. This projecting part $B'$ is properly insulated from the electrode C. The electrode C is provided with a suitable terminal $C^4$ and is supported by the connecting portion $C^3$, which extends beyond the cup $C^2$ and rests upon the edge of the jar A. As illustrated in Fig. 2, the cups $C'$ and $C^2$ open in opposite directions, as it were. In other words, the open ends of said cups are at opposite ends of the electrode. I prefer to copper-plate the face of the connecting portion $C^3$, and I may also cover it with paraffin. Any suitable depolarizer is placed within the cup $C'$ and the active solution is placed in the jar A, so as to be contained within the cup $C^2$ and around said cup when the parts are in their proper position. The cup $C^2$ surrounds the cup $C'$, as shown. By this construction I get a large area of electrodes and I am enabled to provide a battery which produces a large quantity of current at a comparatively high voltage. This battery also has a low internal resistance and other advantageous features.

I have described the construction in detail; but it is of course evident that the parts may be varied in certain particulars, and I therefore do not limit myself to the device shown and described.

I claim—

1. An electrode for electric batteries, comprising two cups or receptacles integral with each other and separated by a suitable space, said cups or receptacles opening in opposite directions.

2. An electric battery, comprising an electrode consisting of two cups or receptacles integral with each other and opening in opposite directions, said cups or receptacles separated by a space, and a second electrode contained within said space so as to be opposed to the faces of both of said cups.

3. An electrode for electric batteries, comprising two carbon-cups opening in opposite directions and separated by a space, and a connecting-piece between the cups integral with both cups.

4. An electrode for electric batteries, comprising two carbon-cups opening in opposite directions and separated by a space, and a connecting-piece between the cups integral with both cups, said connecting-piece adapted to act as a support for the electrode.

DAVID H. WILSON.

Witnesses:
FANNY B. FAY,
HOMER L. KRAFT.